(12) United States Patent
Henning et al.

(10) Patent No.: US 10,422,394 B2
(45) Date of Patent: Sep. 24, 2019

(54) DISC BRAKE

(71) Applicant: WABCO Europe BVBA, Brussels (BE)

(72) Inventors: Paul Henning, Schwetzingen (DE); Hans-Christian Jungmann, Gorxheimertal (DE)

(73) Assignee: WABCO EUROPE BVBA, Brussels (BE)

( * ) Notice: Subject to any disclaimer, the term of this patent is extended or adjusted under 35 U.S.C. 154(b) by 0 days.

(21) Appl. No.: 15/518,773

(22) PCT Filed: Dec. 3, 2015

(86) PCT No.: PCT/EP2015/002436
§ 371 (c)(1),
(2) Date: Apr. 13, 2017

(87) PCT Pub. No.: WO2016/107665
PCT Pub. Date: Jul. 7, 2016

(65) Prior Publication Data
US 2017/0241495 A1    Aug. 24, 2017

(30) Foreign Application Priority Data

Dec. 29, 2014 (DE) .................. 10 2014 019 618

(51) Int. Cl.
*F16D 65/097* (2006.01)
*F16D 55/225* (2006.01)
*F16D 55/00* (2006.01)

(52) U.S. Cl.
CPC ....... *F16D 65/0978* (2013.01); *F16D 55/225* (2013.01); *F16D 2055/007* (2013.01)

(58) Field of Classification Search
CPC .............. F16D 65/097; F16D 65/0977; F16D 65/0978; F16D 55/225; F16D 2025/0041
USPC ............................................ 188/73.37, 73.38
See application file for complete search history.

(56) References Cited

U.S. PATENT DOCUMENTS

| 4,773,511 | A | | 9/1988 | Giering et al. |
| 5,090,520 | A | * | 2/1992 | Gockel ................ F16D 55/226 188/264 G |
| 9,933,028 | B2 | * | 4/2018 | Falter ................ F16D 65/0978 |
| 2004/0163901 | A1 | * | 8/2004 | Thomas ............... F16D 55/226 188/73.31 |

(Continued)

FOREIGN PATENT DOCUMENTS

| DE | 102007049979 A1 | 4/2009 |
| DE | 102012006092 A1 | 9/2013 |
| EP | 0248385 B1 | 12/1989 |

(Continued)

*Primary Examiner* — Thomas J Williams
(74) *Attorney, Agent, or Firm* — Leydig, Voit & Mayer, Ltd.

(57) ABSTRACT

A disc brake includes a brake pad, a retaining spring, and a retaining bracket. The retaining bracket pretensions the retaining spring radially inwardly relative to a rotation axis of a brake against the brake pad. A smallest radial distance (D) of the retaining spring from the brake pad in a region in which the retaining bracket overlaps the retaining spring in a radial direction is greater than a smallest radial distance (d) of the retaining bracket from the brake pad in a region in which the retaining bracket overlaps the brake pad in the radial direction.

10 Claims, 9 Drawing Sheets

(56) References Cited

U.S. PATENT DOCUMENTS

2004/0168868 A1* 9/2004 Thomas .............. F16D 65/0977
188/73.37

FOREIGN PATENT DOCUMENTS

| EP | 0703378 A1 * | 3/1996 | ......... F16D 65/0977 |
| EP | 1441141 A1 | 7/2004 | |

* cited by examiner

Fig. 6

DISC BRAKE

CROSS REFERENCE TO RELATED APPLICATIONS

This application is a U.S. National Stage Application under 35 U.S.C. § 371 of International Application No. PCT/EP2015/002436 filed on Dec. 3, 2015, and claims benefit to German Patent Application No. DE 10 2014 019 618.6 filed on Dec. 29, 2014. The International Application was published in German on Jul. 7, 2016 as WO 2016/107665 A1 under PCT Article 21(2).

FIELD

The invention concerns a disc brake, in particular for trucks, with a brake pad, a retaining spring and a retaining bracket, wherein the retaining bracket pretensions the retaining spring radially inwardly relative to a rotation axis of the brake against the brake pad.

BACKGROUND

Disc brakes with a retaining bracket that pretensions a retaining spring radially inwardly relative to a rotation axis of a brake against a brake pad are known, for example from EP 248 385 B1. With such disc brakes, the retaining spring serves to hold the brake pad in a shaft formed on the brake carrier or on the brake caliper of the disc brake, in which the brake pad is inserted from the radial outside. The brake pad can therefore move radially outward under the pretension force of the retaining spring. The term "radial" does not necessarily mean the mathematically precise radial direction. Rather, the term "radial" means the direction in which the brake pad can move "outward" against the pretension force of the retaining spring.

Such movements of the brake pad in the radial direction, or "outward", are observed in particular on poor road surfaces. With the known disc brakes, when the outward radial movement exceeds a particular extent, the brake pad hits against the retaining spring. The retaining spring then becomes seized between the brake pad and the retaining bracket. This seizing, which under some circumstances is accompanied by considerable clamping forces and which can occur very frequently in particular on poor road surfaces, damages the retaining spring, shortening its service life.

SUMMARY

In an embodiment, the present invention provides a disc brake. The disc brake includes a brake pad, a retaining spring, and a retaining bracket. The retaining bracket pretensions the retaining spring radially inwardly relative to a rotation axis of a brake against the brake pad. A smallest radial distance (D) of the retaining spring from the brake pad in a region in which the retaining bracket overlaps the retaining spring in a radial direction is greater than a smallest radial distance (d) of the retaining bracket from the brake pad in a region in which the retaining bracket overlaps the brake pad in the radial direction.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

A disk brake is described herein in which a retaining spring is protected from certain damage so as to provide for extended service life.

According to embodiments of the invention, the smallest radial distance of the retaining spring from the brake pad in the region in which the retaining bracket overlaps the retaining spring in the radial direction, is greater than the smallest radial distance of the retaining bracket from the brake pad in the region in which the retaining bracket overlaps the brake pad in the radial direction.

The above configuration ensures that, when the brake pad moves outward in the radial direction beyond a predefined amount, it hits against the retaining bracket, and hence its further movement is prevented, before it reaches the retaining spring. Since therefore the brake pad cannot, in any operating state, touch the retaining spring in the region in which the retaining bracket overlaps the retaining spring in the radial direction, the retaining spring cannot become seized between the retaining bracket and the brake pad. The damage to the retaining spring resulting from seizing is thus avoided.

In other words, embodiments of the invention provide for stopping a radial movement of a brake pad by contact with a retaining bracket before the brake pad can hit against the retaining spring at a point which lies opposite the retaining bracket in the radial direction.

Where the text above mentions a region in which the retaining bracket overlaps the retaining spring in the radial direction, this need not necessarily be a single cohesive region. For example, embodiments of the invention may also include retaining brackets which have two spokes extending in the axial direction, whereby two regions are formed in which the retaining bracket overlaps the retaining spring in the radial direction. The important factor is only that in such a region, the brake pad cannot make contact with the retaining spring from the radial inside.

In principle, the above radial distances may be selected arbitrarily insofar as said ratios are observed. According to embodiments of the invention, preferably however it is provided that the smallest radial distance of the retaining spring from the brake pad in the region in which the retaining bracket overlaps the retaining spring in the radial direction, lies in the range from 1.5 to 4 mm, further preferably 2 to 3 mm.

Also, according to embodiments of the invention, preferably the smallest radial distance of the retaining bracket from the brake pad in the region in which the retaining bracket overlaps the brake pad in the radial direction, lies in the range from 1 to 3.5 mm, further preferably 1.5 to 2.5 mm.

According to further preferred embodiments of the invention, it is provided that in rest state of the brake, the difference between the smallest radial distance of the retaining spring from the brake pad in the region in which the retaining bracket overlaps the retaining spring in the radial direction, and the smallest radial distance of the retaining bracket from the brake pad in the region in which the retaining bracket overlaps the brake pad in the radial direction, lies in the range from 0.5 to 2 mm, further preferably 1 to 1.5 mm.

According to particularly preferred embodiments of the invention, a shoulder is provided, the radial delimitation of which determines the smallest radial distance of the retaining bracket from the brake pad in the region in which the retaining bracket overlaps the brake pad in the radial direction. In other words, according to these embodiments of the invention, a specific stop is provided in order to ensure that, on radially outward movement, the brake pad hits against the retaining bracket before it reaches the retaining spring.

The shoulder may lie in front of or behind the retaining spring in the axial direction. It may however also extend through a passage opening in the retaining spring. In both cases, it may simultaneously serve to support the retaining spring in at least one axial direction. According to further preferred embodiments of the invention, the shoulder is formed on the brake pad.

According to further embodiments of the invention, the shoulder can reach over the retaining spring. In this way, the shoulder simultaneously serves to prevent the retaining spring in the radial direction from lifting from the brake pad beyond a predefined amount or at all. Finally, according to embodiments of the invention the shoulder can be formed on the retaining bracket.

Figure 1:
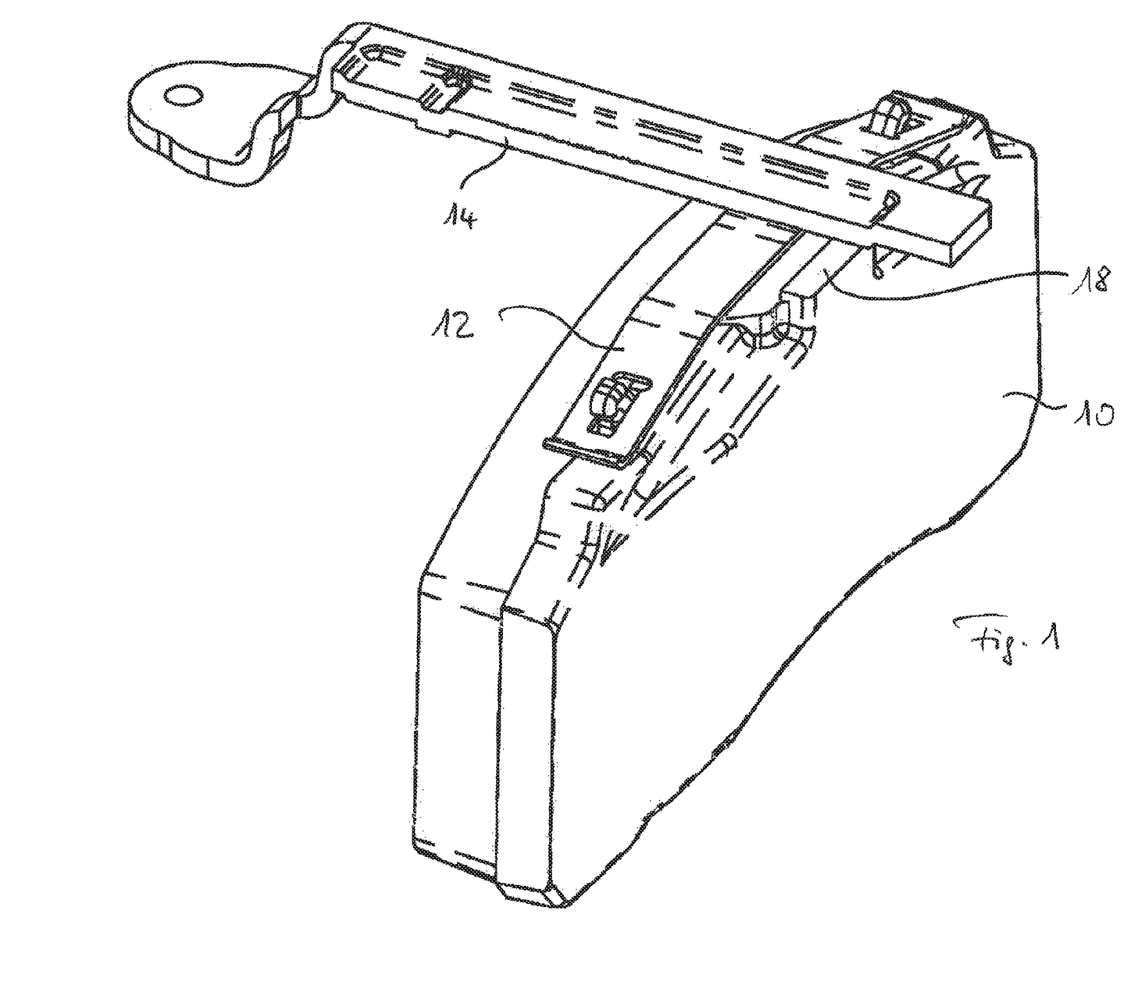
FIG. 1 is a diagrammatic perspective view of a first embodiment of the invention.
Figure 2:
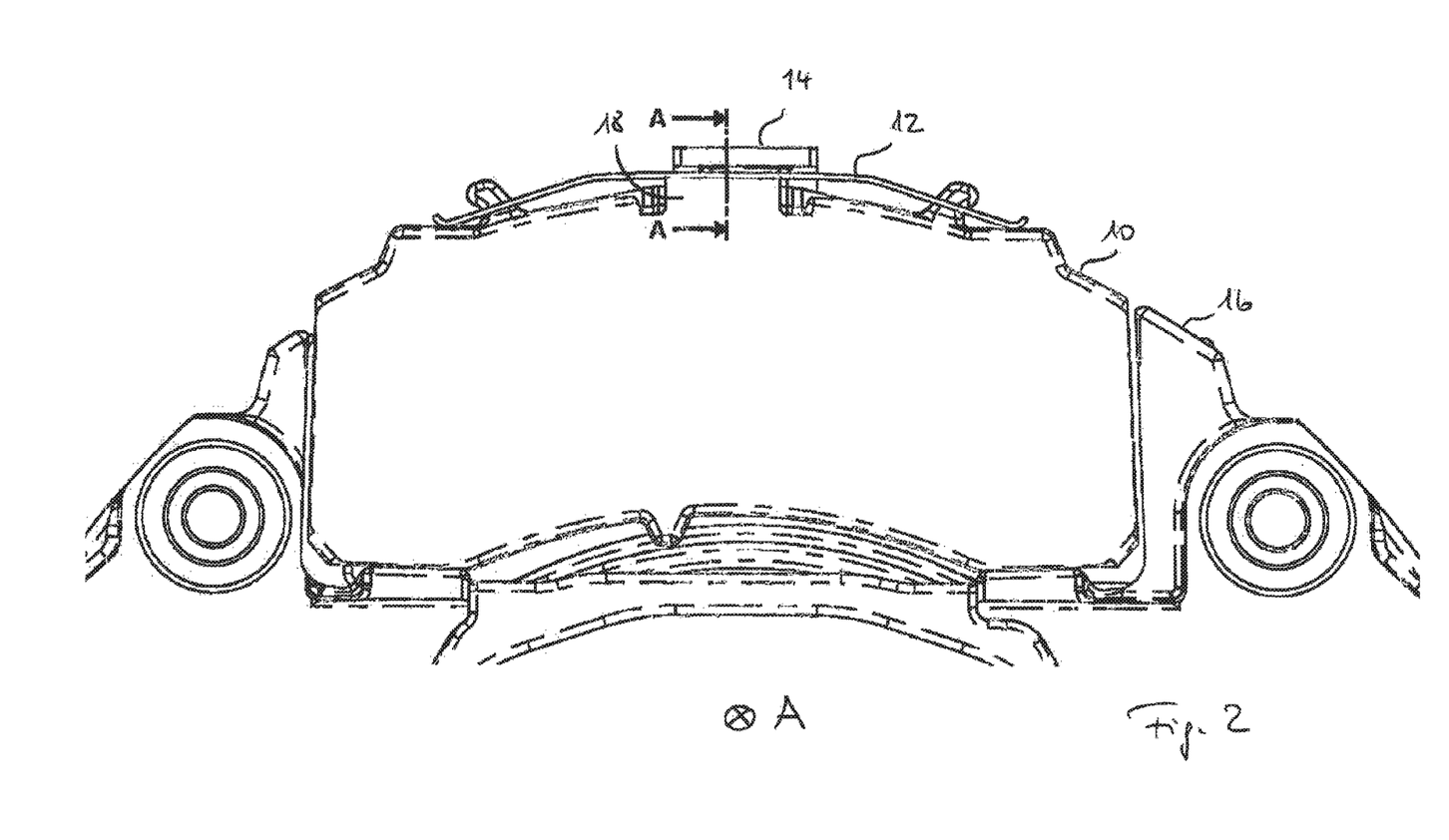
FIG. 2 is an axial view of the first embodiment of the invention in a rest state.
Figure 3:
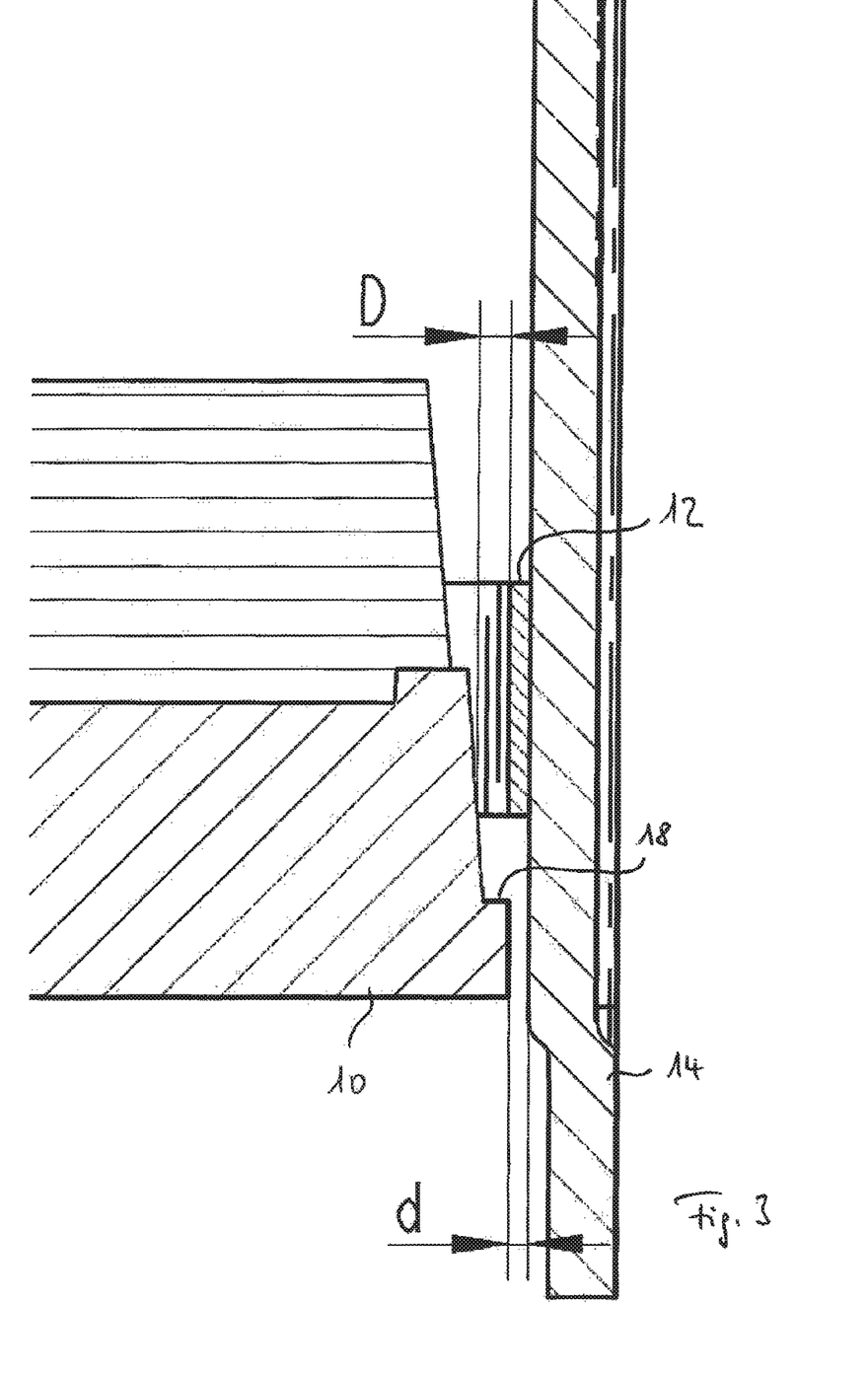
FIG. 3 is an enlarged partial section view along line A-A in FIG. 2.
Figure 4:
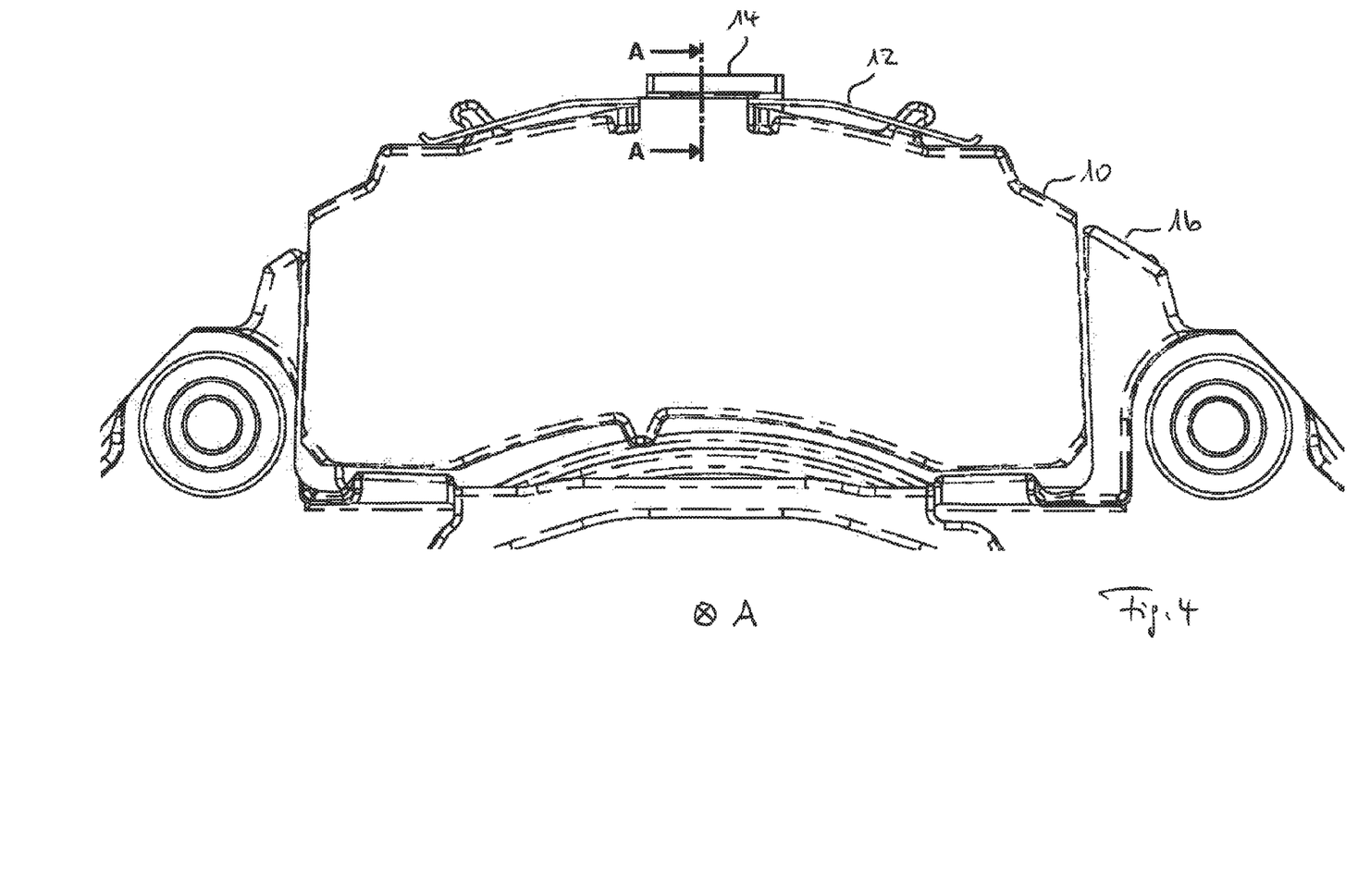
FIG. 4 is an axial view of the first embodiment of the invention in a deflected state.

FIGS. 1 through 5 show a first embodiment of the invention with a brake pad 10, a retaining spring 12 and a retaining bracket 14. As shown in FIGS. 2 and 4, in the exemplary embodiment shown in the drawing, the brake pad 10 is held in a brake carrier 16 of a disc brake. The rotation axis of the brake is designated A. The brake carrier 16 here receives the brake pad 10 in a shaft in which the brake pad 10 is supported or guided in the peripheral direction and radially inwardly. The brake carrier 16 to this extent forms a substantially U-shaped shaft. The shaft is open on the radial outside. By means of the retaining bracket 14, the brake pad 10 is pressed radially inwardly into the shaft. The retaining spring 12 here lies between the retaining bracket 14 and the brake pad 10. With this configuration, the brake pad 10 may move radially outward against the return force of the retaining spring 12.

Figure 5:
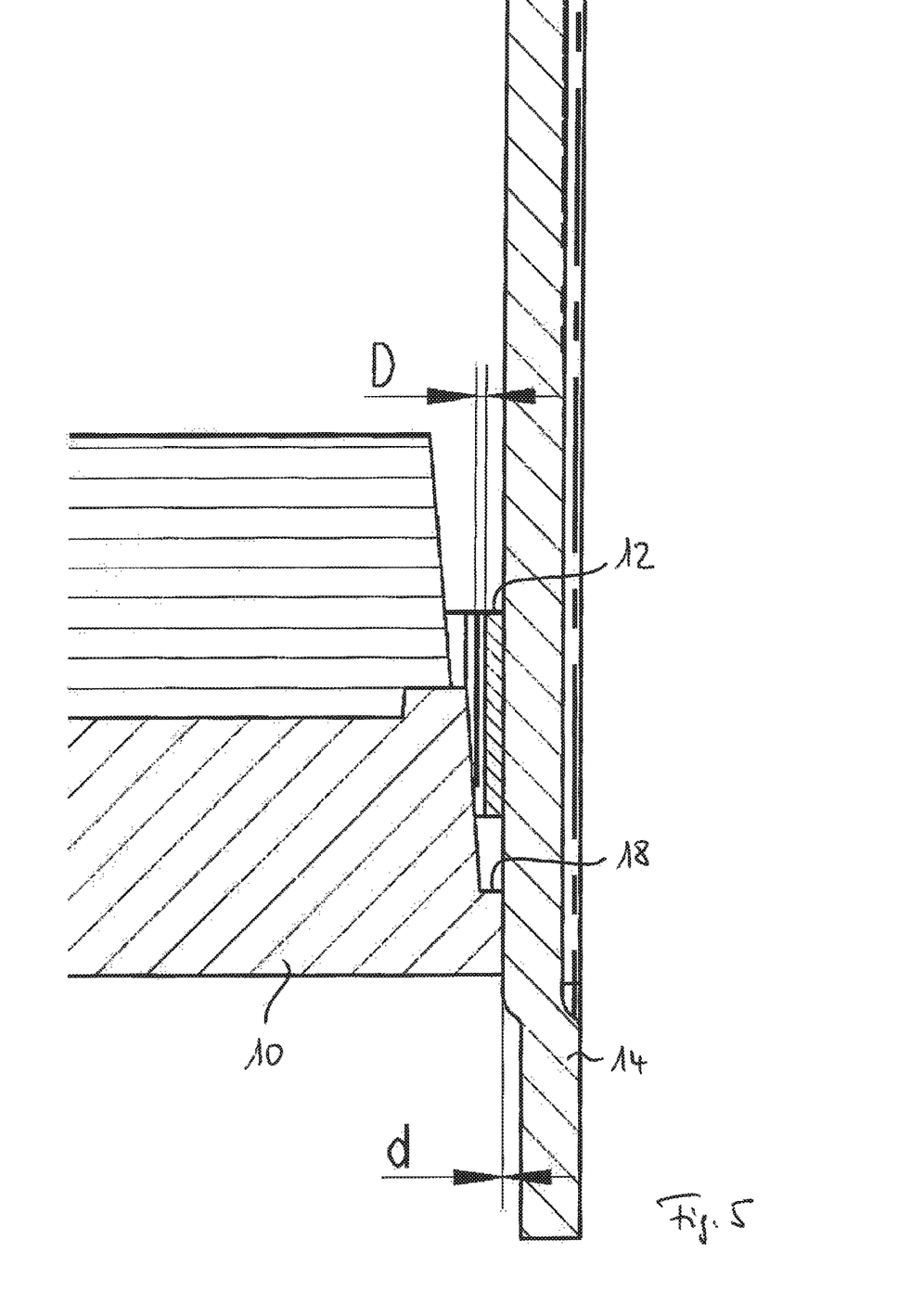
FIG. 5 is an enlarged partial section view along line A-A in FIG. 4.
Figure 6:
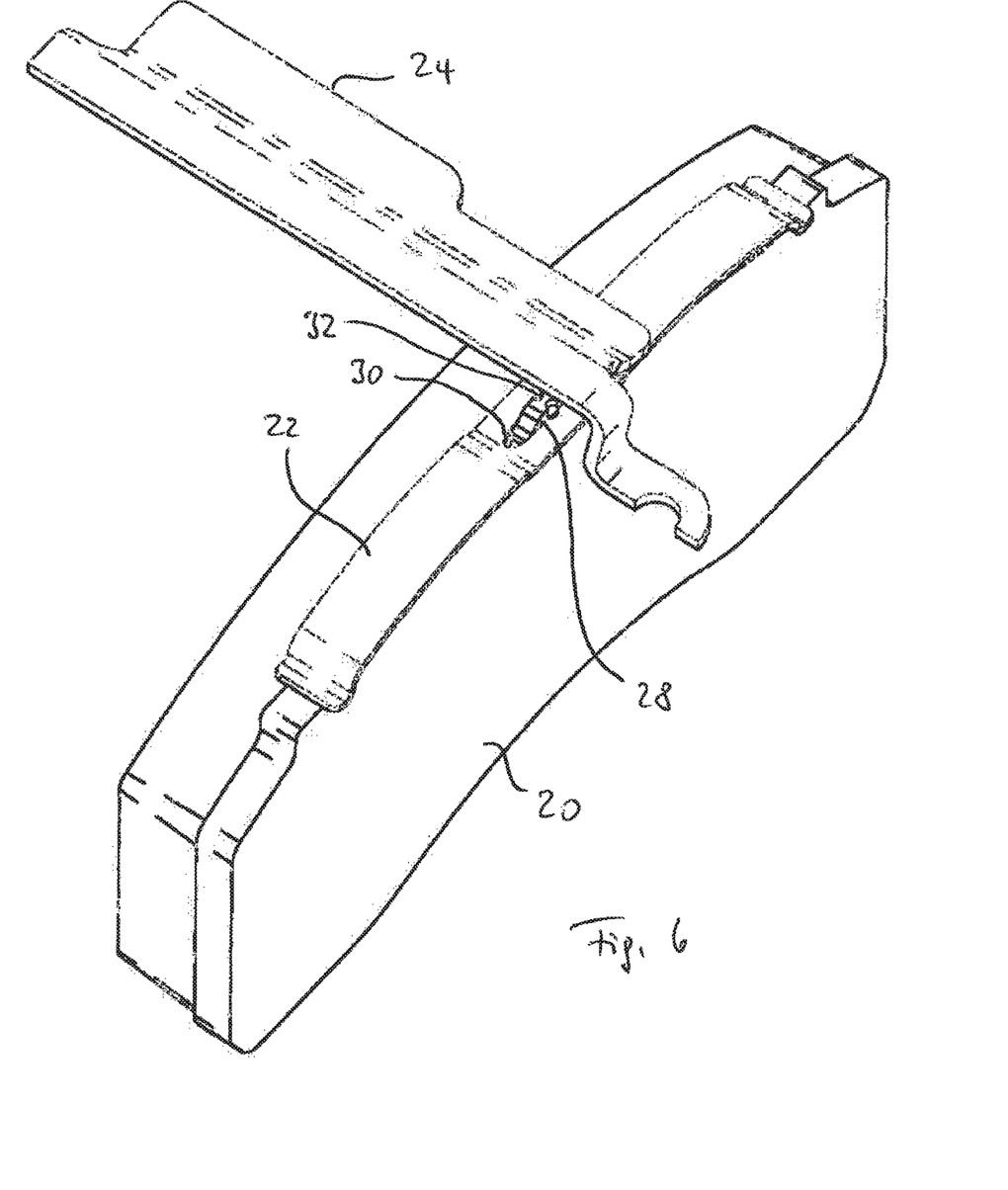
FIG. 6 is a diagrammatic perspective view of a second embodiment of the invention.

In FIGS. 3 and 5, the smallest radial distance of the retaining spring 12 from the brake pad 10 in the region in which the retaining bracket 14 overlaps the retaining spring 12 in the radial direction, is designated D.

In the exemplary embodiment shown in FIGS. 1 to 5, the brake pad is provided with a shoulder 18 which is arranged in the region in which the retaining bracket 14 overlaps the brake pad 10 in the radial direction. The smallest radial distance of the retaining bracket from the shoulder 18 and hence from the brake pad 10 is designated d. In the rest state of the brake shown in FIGS. 2 and 3, distance D is 2 mm, whereas distance d is just 1 mm.

The situation is different in the operating state shown in FIGS. 4 and 5. Namely, the brake pad 10 is deflected towards the outside in the radial direction, which may occur for example on poor road surfaces. In the operating state depicted in FIGS. 4 and 5, the distance d is zero. In other words, the shoulder 18 and hence the brake pad 10 hit against the retaining bracket 14. The distance D however is still 1 mm. The brake pad 10 does not therefore hit against the retaining spring 12. Thus, in particular, seizing of the retaining spring 12 between the retaining bracket 14 and the brake pad 10 is excluded.

As shown in FIG. 1, in the first exemplary embodiment the shoulder 18 lies behind the retaining spring 12 in the axial direction. It extends parallel thereto. The situation is different in the exemplary embodiment according to FIGS. 6 to 9. Here, the brake pad 20 shown has a shoulder 28 which extends through a passage opening 30 in the retaining spring 22. Because of its shoulder 28, the brake pad 20 lies closer in the radial direction to the retaining bracket 24 than to the retaining spring 22. In other words, the radial distance D is again smaller than the radial distance d.

Figure 7:
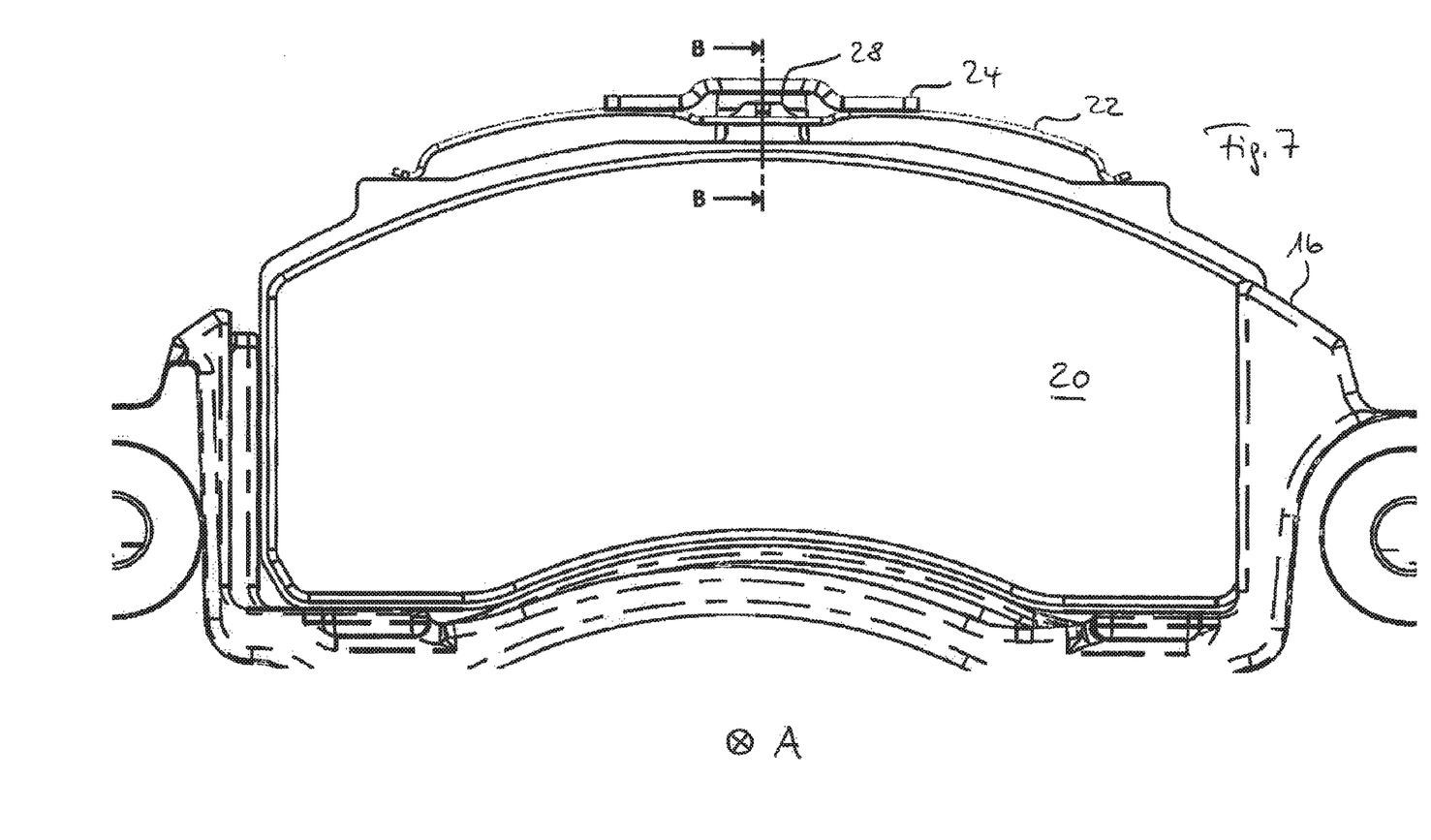
FIG. 7 is an axial view of the second embodiment of the invention in a rest state.
Figure 8:
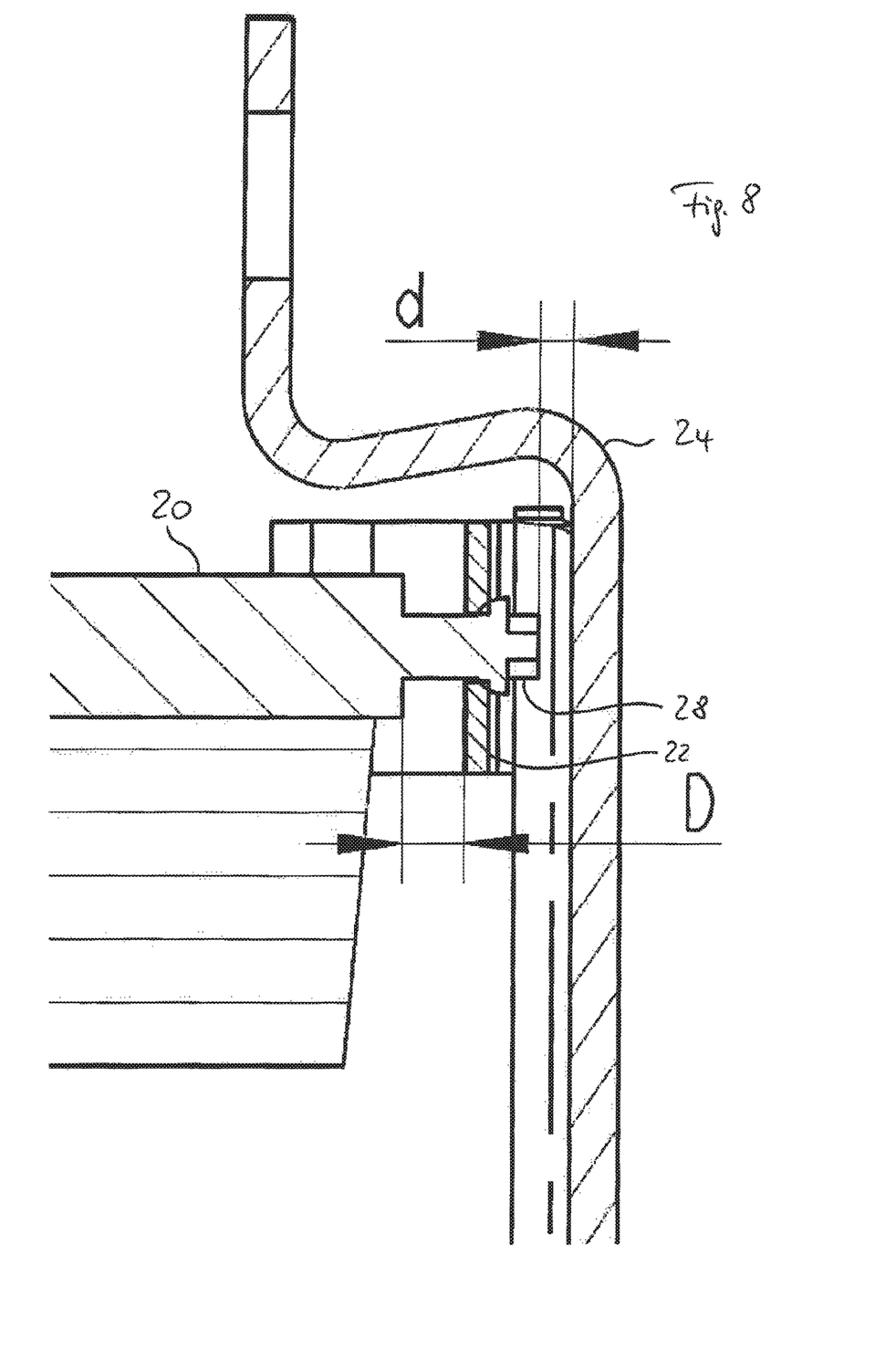
FIG. 8 is an enlarged partial section view along line B-B in FIG. 7.

FIGS. 7 and 8 show the second exemplary embodiment of the invention in rest state, corresponding to FIGS. 2 and 3 showing the first exemplary embodiment. Since the radial distance D is greater than the radial distance d, on a deflection of the brake pad 20 radially outward, for example on a poor road surface, the brake pad 20 hits with its shoulder 28 against the retaining bracket 24 before the brake pad 20 reaches the retaining spring 22. Once again, seizing of the retaining spring 22 between the brake pad 20 and the retaining bracket 24 is reliably avoided.

The shoulder 28 has two cranked portions with which it reaches radially outwardly over the retaining spring 22. Thus the retaining spring 22 is secured on the brake pad 20 or on its shoulder 28 even when the retaining bracket 24 is removed. It cannot spring away radially outwardly, which would constitute a danger.

Figure 9:
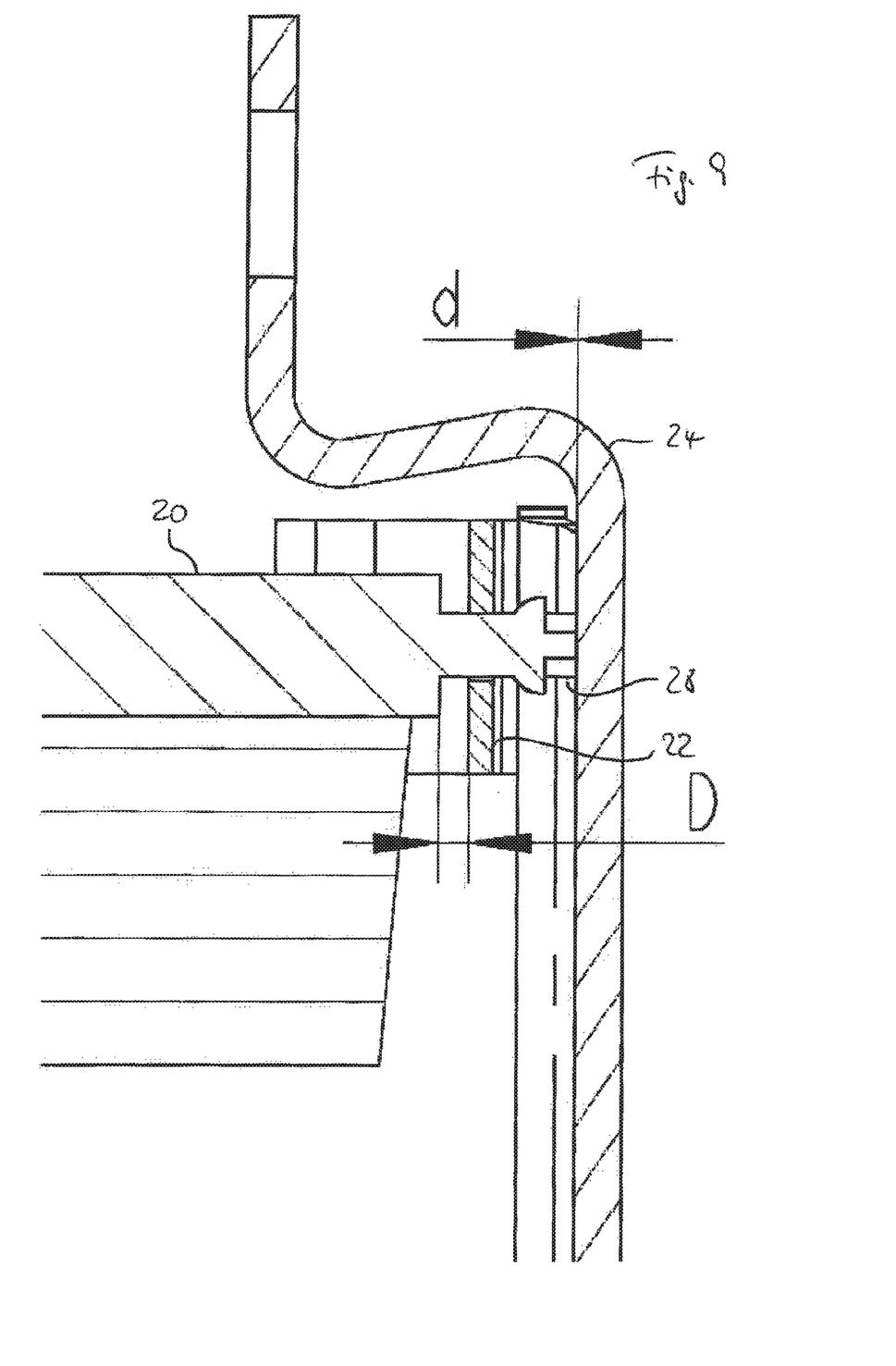
FIG. 9 is an enlarged partial section view along line B-B in FIG. 7 of the second embodiment of the invention in a deflected state.

FIG. 9 shows a second embodiment in a deflected state, corresponding to FIG. 5 showing the first exemplary embodiment. Once again, distance d is zero.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 Brake pad
12 Retaining spring
14 Retaining bracket
16 Brake carrier
18 Shoulder
20 Brake pad
22 Retaining spring
24 Retaining bracket
28 Shoulder
30 Passage opening
32 Cranked portion
d Radial distance
D Radial distance
A Brake axis

The invention claimed is:

1. A disc brake comprising:
a brake pad;
a retaining spring; and
a retaining bracket configured to pretension the retaining spring radially inwardly relative to a rotation axis of a brake against the brake pad,
wherein a smallest radial distance (D) of the retaining spring from the brake pad in a region in which the retaining bracket overlaps the retaining spring in a radial direction is greater than a smallest radial distance (d) of the retaining bracket from the brake pad in a region in which the retaining bracket overlaps the brake pad in the radial direction.

2. The disc brake as claimed in claim 1, wherein the smallest radial distance (D) of the retaining spring from the brake pad in the region in which the retaining bracket overlaps the retaining spring in the radial direction ranges from 1.5 to 4 mm.

3. The disc brake as claimed in claim 1, wherein the smallest radial distance (d) of the retaining bracket from the brake pad in the region in which the retaining bracket overlaps the brake pad in the radial direction ranges from 1 to 3.5 mm.

4. The disc brake as claimed in claim 1, wherein in a rest state of the brake, a difference between the smallest radial distance (D) of the retaining spring from the brake pad in the region in which the retaining bracket overlaps the retaining spring in the radial direction and the smallest radial distance (d) of the retaining bracket from the brake pad in the region in which the retaining bracket overlaps the brake pad in the radial direction ranges from 0.5 to 2 mm.

5. The disc brake as claimed in claim 1, further comprising a shoulder, wherein a radial delimitation of the shoulder determines the smallest radial distance (d) of the retaining bracket from the brake pad in the region in which the retaining bracket overlaps the brake pad in the radial direction.

6. The disc brake as claimed in claim 5, wherein the shoulder lies in front of or behind the retaining spring in the axial direction.

7. The disc brake as claimed in claim 5, wherein the shoulder extends through a passage opening in the retaining spring.

8. The disc brake as claimed in claim 5, wherein the shoulder is formed on the brake pad.

9. The disc brake as claimed in claim 8, wherein the shoulder reaches over the retaining spring.

10. The disc brake as claimed in claim 5, wherein the shoulder is formed on the retaining bracket.

* * * * *